Jan. 24, 1928.
J. S. THOMPSON
1,657,238
FRICTION BLOCK
Filed April 13, 1927
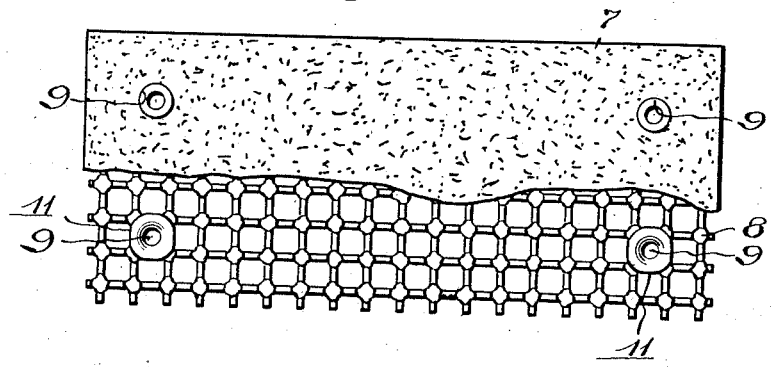
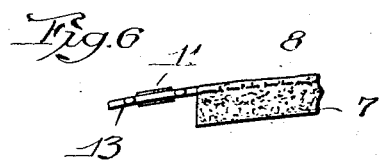
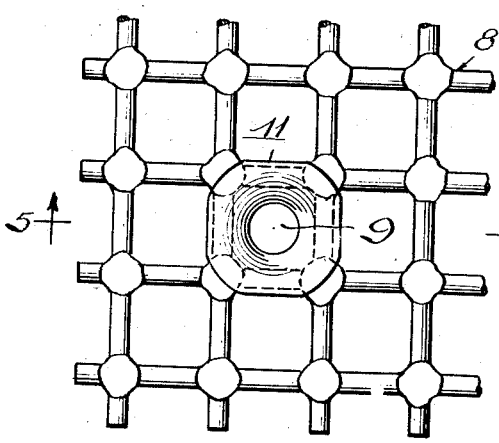
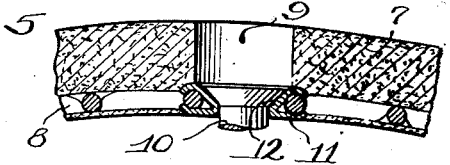
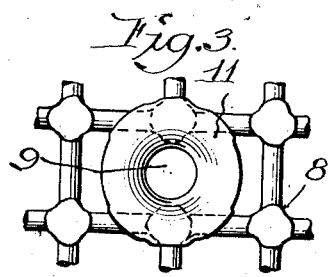
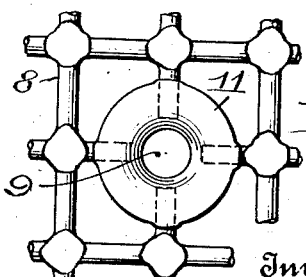
Inventor
James S. Thompson
By his Attorney Patented Jan. 24, 1928.

1,657,238

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BLOCK.

Application filed April 13, 1927. Serial No. 183,382.

This invention relates to friction blocks comprising a composition body anchored to a metal back and adapted for braking a moving member by frictional contact therewith. These friction blocks may be used in many different kinds of brake assemblies, including internal expanding and external contracting brakes for automotive vehicles, and in other brake installations.

The object of the invention is to provide a novel and sufficient anchorage in the block to receive the devices which are employed for fastening the block to its support.

Another object of the invention is to provide anchorage means in a reticulated back for securely holding the fastening devices whereby the block may be rigidly held in place on its support in all conditions of service.

In the accompanying drawings illustrating selected embodiments of the invention, Fig. 1 is a plan view of a block with the composition body extending to the ends of the back and partly broken away to better illustrate the invention.

Figs. 2, 3 and 4 illustrate different positions of the anchoring eyelet in the back.

Fig. 5 is a transverse sectional view of the shoe on the line 5—5 of Fig. 2.

Fig. 6 is a detail view showing the invention embodied in a back which extends beyond the end of the body.

Referring to the drawings the block comprises a body 7 mounted upon and anchored to a reticulated metal back 8, which may be made of wire mesh, expanded metal or other reticulated material. The body is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose. The back is embedded in the body and rigidly united therewith. This can be accomplished conveniently by inserting the back in a mold and molding the body material thereon under pressure sufficient to force the body material through the interstices of the back and into anchoring engagement with the strands of the back. The back forms a support and carrier for the composition body to which the body is securely anchored against displacement under all usual service conditions. I provide openings 9 which extend through the block to receive rivets 10 or other suitable fastening means whereby the block may be fastened to the head or band or other support of a brake assembly. In the commercial manufacture of the blocks the openings 9 may register with interstices in the back, as shown in Figs. 1 and 2, but they may also sever one or more strands of the back, as shown in Figs. 3 and 4. Furthermore, the interstices of the back may be larger than the openings 9, as shown in the drawings. Therefore to provide a strong and substantial anchorage for the rivet or other fastening device I provide an eyelet 11 for each fastening opening 9. This eyelet is made of a suitable diameter to clamp upon opposite sides of two or more strands of the reticulated back. In Figs. 1 and 2 the eyelets are shown registering with interstices of the back and each clamping four strands of the back and at and between their intersections. Fig. 3 shows a strand severed to accommodate the opening 9 and the eyelet clamps the severed ends of this strand and two adjacent strands including their intersections with the severed strand. Fig. 4 shows two strands severed at their intersection to accommodate the opening 9 and the eyelet engages the four ends of the severed strands. In each case the eyelet is rigidly engaged with the back and constitutes a firm and safe anchorage for the rivet or other fastening device. In clamping the eyelet upon the back a sufficient pressure may be applied to indent the eyelet between the strands and the eyelet is shaped about the fastening opening to form a seat 12 for the head of the rivet, as shown in Fig. 5. In Fig. 1 I have shown the body extending to the ends of the back, but the back may be extended beyond the ends of the body, as shown at 13 in Fig. 6, in which case the eyelets 11 would be located in the extended ends 13.

In friction blocks of this general type it is necessary that the composition body and the supporting back thereon be securely anchored together. This can be conveniently and efficiently effected by providing a reticulated metal back and molding the body thereon under pressure. But it is also important, and necessary, that provision should be made for anchoring the fastening devices securely and rigidly in the block, and this is satisfactorily accomplished for all usual conditions by the provision of eyelets securely anchored to the reticulated back about the fastening openings in the block. The eyelets are of sufficient size to engage the strands of the back, regardless of the location of the fastening openings in the back, to provide a secure anchorage for the eyelets with the back, so that they will not yield or work loose under the strains of service and will always provide a rigid anchorage for the rivets or other devices by which the blocks are mounted on the support. Since the eyelets are clamped tightly upon the reticulated back and constitute anchorage for the fastening devices, it is not important where the fastening openings are located in the block and particularly in the back, whether the openings register with interstices in the back, or whether they sever one or more strands of the back. Therefore the fastening openings may be disposed in the block in any position required for mounting the blocks on a support. The eyelets will hold the wire mesh, for example, sufficiently rigid to satisfy some conditions, but for others it may be desirable to apply a galvanizing coating to make the mesh rigid and prevent it from skewing; and the back may also be rolled to flatten it if desired.

The invention is capable of embodiment in friction blocks of different kinds and for different purposes; it can be made in all sizes and shapes desired and as many fastening openings may be provided as required and they may be located wherever desired. The reticulated back enables the body to be securely anchored thereto and the eyelets are easily and effectively anchored to the back and provide substantial anchorage for the fastening devices. Each eyelet is made in one piece adapted to be clamped and riveted upon the strands of the back. The eyelets are made of brass or other soft metal which can be easily deformed so that the eyelet can be indented between the strands to make interlocking engagement therewith and shaped to form a seat for the fastening device. It is not necessary that the top and bottom of the eyelet should be deformed sufficiently to contact when the eyelet is set, and preferably they are spaced apart so that the body material may enter and fill all the voids between the top and bottom of the eyelet during the molding operation. The construction is simple and economical, but it provides the efficiency necessary for a friction block of this kind. Changes in the form, construction and arrangement of parts may be made as found desirable to satisfy different conditions within the scope of the following claims.

I claim:

1. A friction block comprising a reticulated back, a composition body anchored on the back, the block having an opening extending through the body and the back to receive a device for fastening the block to a support, and a one piece eyelet clamped to the strands of the back around the fastening opening therein.

2. A friction block comprising a reticulated back, a composition body anchored on the back, the block having an opening extending through the body and the back to receive a device for fastening the block to a support, and a one piece eyelet clamped to the strands of the back around the fastening opening therein and indented between the strands of the back.

3. A friction block comprising a reticulated back, a composition body anchored on the back, the block having an opening extending through the body and the back to receive a device for fastening the block to a support, and a one piece eyelet clamped to the strands of the back around the fastening opening therein, said eyelet being shaped to form a seat for the head of the fastening device.

JAMES S. THOMPSON.